(12) United States Patent
Estrada et al.

(10) Patent No.: US 6,970,271 B1
(45) Date of Patent: Nov. 29, 2005

(54) DEVICE INDEPENDENT TRAP COLOR SPECIFICATION

(75) Inventors: James J. Estrada, San Jose, CA (US); John P. Felleman, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 858 days.

(21) Appl. No.: 09/922,345

(22) Filed: Aug. 3, 2001

(51) Int. Cl.7 ................................................. G03F 3/08
(52) U.S. Cl. ...................... 358/1.9; 358/518; 358/3.27; 358/2.1; 382/162; 382/163; 382/164; 382/167; 345/604
(58) Field of Search .................. 358/518, 1.9, 515, 358/2.1, 523, 3.27, 3.23, 530; 382/162, 163, 382/164, 167; 345/591, 604, 597, 629; H04N 1/58

(56) References Cited

U.S. PATENT DOCUMENTS

| | | | |
|---|---|---|---|
| 6,345,117 B2 * | 2/2002 | Klassen | 382/167 |
| 6,509,903 B1 * | 1/2003 | Yosefi | 345/597 |
| 6,549,303 B1 * | 4/2003 | Trask | 358/1.9 |
| 6,654,145 B1 * | 11/2003 | Speck | 358/1.9 |
| 6,781,720 B1 * | 8/2004 | Klassen | 358/3.27 |
| 6,813,040 B1 * | 11/2004 | Uchino et al. | 358/1.9 |
| 2001/0052907 A1 * | 12/2001 | Mukai et al. | 345/629 |
| 2001/0055130 A1 * | 12/2001 | Geurts et al. | 358/530 |
| 2002/0051156 A1 * | 5/2002 | Weinholz et al. | 358/1.9 |
| 2002/0122044 A1 * | 9/2002 | Deering | 345/597 |

FOREIGN PATENT DOCUMENTS

EP 840500 A2 * 5/1998 ............ H04N 1/58

* cited by examiner

Primary Examiner—Kimberly Williams
Assistant Examiner—Beniyam Menberu
(74) Attorney, Agent, or Firm—Fish & Richardson P.C.

(57) ABSTRACT

The invention provides a method and computer program of instructions for specifying a device independent trap color in a color space for a color boundary. The method includes obtaining a first color value (C1), representing a first color in a color space associated with the color boundary, having a first darkness and first chromaticity and obtaining a second color value (C2), representing a second color in the color space associated with the color boundary, having a second darkness and second chromaticity. The method includes generating a trap color value, representing a color in the color space, having substantially a same darkness as a lighter of the first and second color value, and a chromaticity that is a function of the first and second chromaticities of the first and second color values.

21 Claims, 2 Drawing Sheets

DEVICE INDEPENDENT TRAP COLOR SPECIFICATION

BACKGROUND OF THE INVENTION

The present invention relates generally to computer-implemented trapping processes and, more particularly, to the specification of device independent trap colors.

As the availability, affordability, and use of publishing systems increase, techniques for preparing and reproducing pages on a variety of output devices have been developed. Output devices may include image setters, printers, monitors, and digital printing presses. A page may include various types of objects such as text, line art, and images, and its appearance is generally described by page description language (PDL) instructions. PDL instructions are executed by an output device to generate physical output having the desired appearance.

A color page additionally includes information about the colors used in the page. Colors are described in accordance with a "color space," which defines a data representation in terms of basic color components. The CMYK color space has four components (cyan (C), magenta (M), yellow (Y), and key (K) or black) and represents the color to be applied at a particular location on the page as a combination of four values: one representing the amount of cyan; one representing the amount of magenta; one representing the amount of yellow; and one representing the amount of black. In contrast, the CIELAB (Commission Internationale de l'Eclairage) color space represents color as a combination of three values: one representing luminosity (L); and two (A and B) which, in combination, represent chromaticity. Luminosity refers to the overall brightness of a color. Chromaticity refers to the quality of a color characterized by its dominant and complementary wavelength and purity taken together.

These color data representations are used to create color separations which, in turn, are used by output devices to generate a color output page. Generally, one separation is created for each color component in the device's color space. For example, the PDL representation of a page to be output by an image setter using the CMYK color space is used to create four color separations, one for each color component cyan, magenta, yellow, and black. Each separation indicates where on the page the corresponding ink should be applied. The same color data representation, if output on an image setter using an RGB (red-green-blue) color system, is used to create color separations for red, green, and blue inks.

Misalignment, also referred to as misregistration, of separations can cause unintentional gaps or overlaps in the generated output page where regions containing different colors abut. To minimize the effects of misalignment, a trapping technique can be applied to PDL representation to adjust the shapes of abutting color regions. Trapping is used to spread (expand) some separation color regions to prevent gaps, or choke (contract) separation color regions to prevent overlaps. The adjusted areas into which inks will be spread, or from which inks will be choked, are referred to as "trap regions." Each trap region includes a trap color defining a color for the trap region.

Because trapping involves adjusting the shape of separation regions, and separations correspond to an output device's specific ink color, trapping has traditionally been a device dependent operation. Accordingly, the trapping process is typically forced into the later stages of print production where performance bottlenecks can become a problem. For instance, trapping is often performed in an output device's raster image processor which can have limited amounts of memory and, thus, can significantly slow output production. In addition, because each output device can implement its color components in a unique fashion, specification of trap colors at the time of output generation can result in a single page description looking distinctively different from output device to output device.

SUMMARY OF THE INVENTION

In one aspect the invention provides a method for specifying a device independent trap color in a color space for a color boundary. The method includes obtaining a first color value (C1), representing a first color in a color space associated with the color boundary, having a first darkness and first chromaticity and obtaining a second color value (C2), representing a second color in the color space associated with the color boundary, having a second darkness and second chromaticity. The method includes generating a trap color value, representing a color in the color space, having substantially a same darkness as a lighter of the first and second color value, and a chromaticity that is a function of the first and second chromaticities of the first and second color values.

Aspects of the invention can include one or more of the following features. The first color value and the second color value can have a first and second luminocity value, respectively, and wherein a luminocity value of the trap color can be selected from one of the first and second luminocity values corresponding to a darker of the first and second color value. The first and second color values can be associated with a device dependent space. The method can include, prior to generating a trap color value, transforming the first and the second color values from the device dependent space to a device independent space.

After generating the trap color value, the method can include transforming the trap color value from a device independent space to a device dependent space associated with an output device to be used to render the color boundary. The device independent color space can be the CIELAB color space.

The first color value can be represented by a first luminosity (L1) and a first pair of chromaticity (A1 and B1) color values, the second color value can be represented by a second luminosity (L2) and a second pair of chromaticity (A2 and B2) color values, and the trap color can be represented by a third luminosity (L3) and a third pair of chromaticity (A3 and B3) color values. The trap color can be generated in accordance with the formulas:

$$L3=\mathrm{DARK}(L1, L2),$$

$$A3=(A2+A1)/2, \text{ and } B3=(B2+B1)/2,$$

where DARK(L1, L2) returns that value corresponding to a darker of the first and second luminosity color values L1 and L2.

In another aspect, the invention provides a method of specifying output device independent trapping color values in a graphical processing system. The method includes obtaining a computer readable file including color objects, identifying color boundaries between color objects, each color boundary having an edge and a first color value representing a first color in a color space, and a second color value representing a second color in the color space. The method includes converting the first and second color values from the color space to a device independent color space, identifying trap regions and generating a trap color value, representing a color in the device independent color space, for each identified trap region. The method further includes storing the generated trap color value in an output file.

Aspects of the invention can include one or more of the following features. The method can include transforming the trap color values from the device independent space to a device dependent space associated with an output device that is to render the color boundaries. The step of identifying trap regions can include identifying only those color boundaries whose difference between respective first and second color values is greater than a predefined threshold value. The difference between color values can be computed by determining a rectilinear distance between the respective first and second color values.

The step of generating a trap color value can include computing a mean difference between the respective first and second color values or selecting the trap color value calorimetrically. Each color value can have a luminocity and a chromaticity value. The trap color luminocity value can correspond to the luminocity value associated with the darker of the first and second color values and the trap color chromaticity value can be a function of the first and second chromaticity values. The trap color value can be selected by mapping a lighter of the respective first and second color values to a chromaticity but at darkness of a darker of the respective first and second color values. The chromaticity can be an average chromaticity or a function of chromaticities associated with the first and second color values. The trap color value can be selected by mapping a lighter of the respective first and second color values to a chromaticity at a darkness of a darker of the respective first and second color values and at a bisection of a line between them.

In another aspect the invention provides a method for specifying a device independent trap color in a color space for a color boundary. The method includes obtaining a first color value (C1), representing a first color in a color space associated with the color boundary, having a first darkness and first chromaticity and obtaining a second color value (C2), representing a second color in the color space associated with the color boundary, having a second darkness and second chromaticity. The method includes generating a trap color value, representing a color in the color space, including computing a mean difference between the respective first and second color values.

In another aspect the invention provides a program storage device readable by a computer system and having encoded therein a program of instructions that includes instructions to obtain a first color value (C1), representing a first color in a color space associated with the color boundary, having a first darkness and first chromaticity and obtain a second color value (C2), representing a second color in the color space associated with the color boundary, having a second darkness and second chromaticity. Instructions are also included to generate a trap color value, representing a color in the color space, having substantially a same darkness as a lighter of the first and second color value, and a chromaticity that is a function of the first and second chromaticities of the first and second color values.

In another aspect, the invention provides a program storage device readable by a computer system and having encoded therein a program of instructions that includes instructions to obtain a computer readable file including color objects, identify color boundaries between color objects, each color boundary having an edge and a first color value representing a first color in a color space, and a second color value representing a second color in the color space. Instructions are included to convert edge color values to a device independent color space, identify trap regions and generate a trap color value, representing a color in the device independent color space, for each identified trap region. Instructions are included to store the generated trap color value in an output file. In another aspect, the invention provides a program storage device readable by a computer system and having encoded therein a program of instructions that includes instructions to obtain a first color value (C1), representing a first color in a color space associated with the color boundary, having a first darkness and first chromaticity, obtain a second color value (C2), representing a second color in the color space associated with the color boundary, having a second darkness and second chromaticity and generate a trap color value, representing a color in the color space, including compute a mean difference between the respective first and second color values.

Advantages of the invention include, but are not limited to, one or more of the following: (1) eliminates the computational over-head of trapping a document each time it is used to generate output; (2) removes the computationally intensive task of trapping from the output device allowing another, more powerful, computer to perform the task; (3) allows a user (or another application) to edit a document's trap regions to accommodate special output requirements; and (4) allows generation of substantially identical output irrespective of the output device. Other features and advantages of the invention will become apparent from the following detailed description and from the claims.

DETAILED DESCRIPTION

Figure 1:
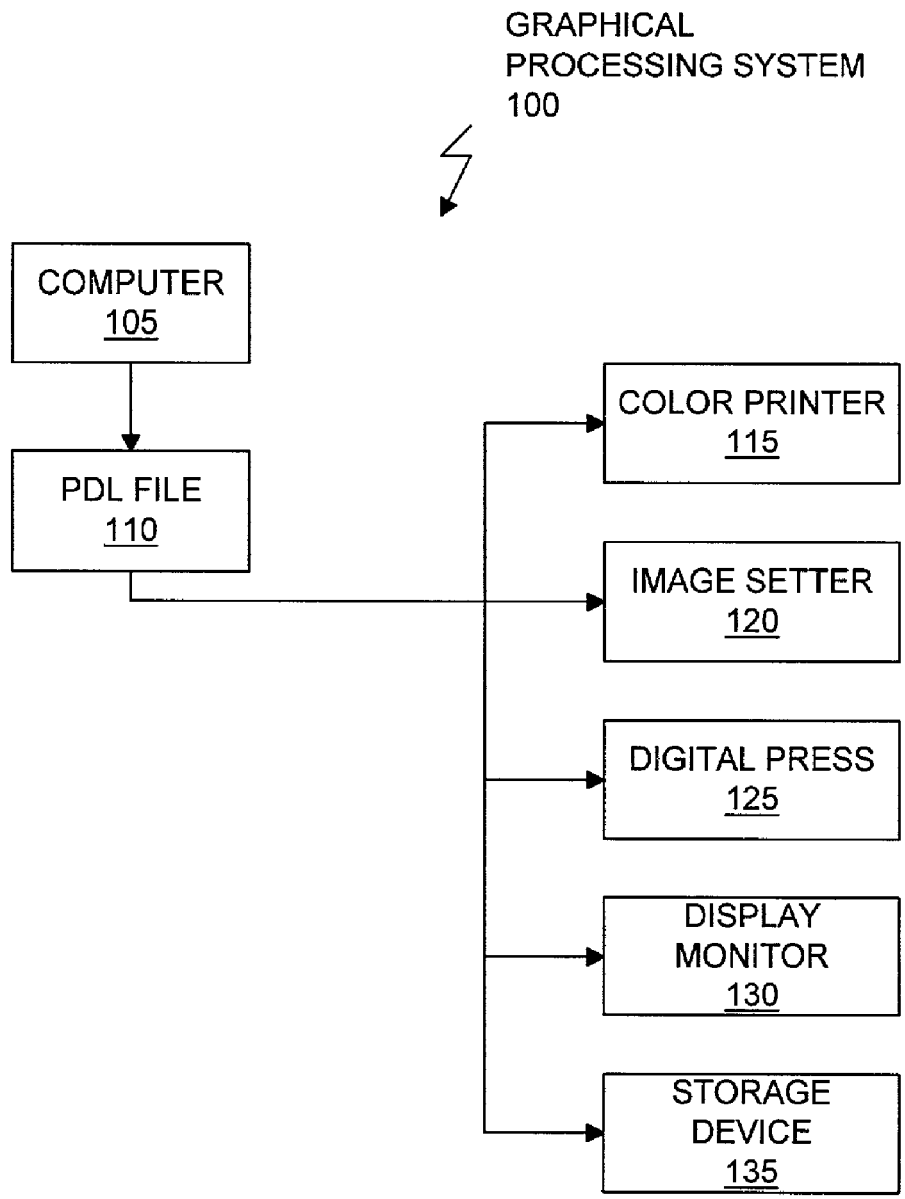
FIG. 1 shows a graphical processing system.

Referring first to FIG. 1, illustrative graphical processing system 100 includes computer 105 and one or more output devices, 115 through 135. Computer 105 can be used to generate a document having one or more pages using any suitable application program. The generated document can be represented in a page description language (PDL) and stored or transmitted to an output device in the form of PDL file 110. Well known PDLs include the POSTSCRIPT and the PORTABLE DOCUMENT FORMAT languages. POSTSCRIPT is a trademark of Adobe Systems Incorporated, a Delaware corporation.

The page(s) represented by PDL file 110 includes traps characterized with trap region colors that are specified in an output device independent color space. The trapping process is described in greater detail below. Once trapped, PDL file 110 can be sent to any output device capable of executing the selected PDL or stored for later display. Example output devices include color printer 115, image setter 120, digital press 125, display monitor 130, and storage device 135. Common storage devices include, but are not limited to, magnetic disks (fixed, floppy, and removable), other magnetic media such as tape, optical media such as CD-ROM disks, and magneto-optical devices.

Figure 2:
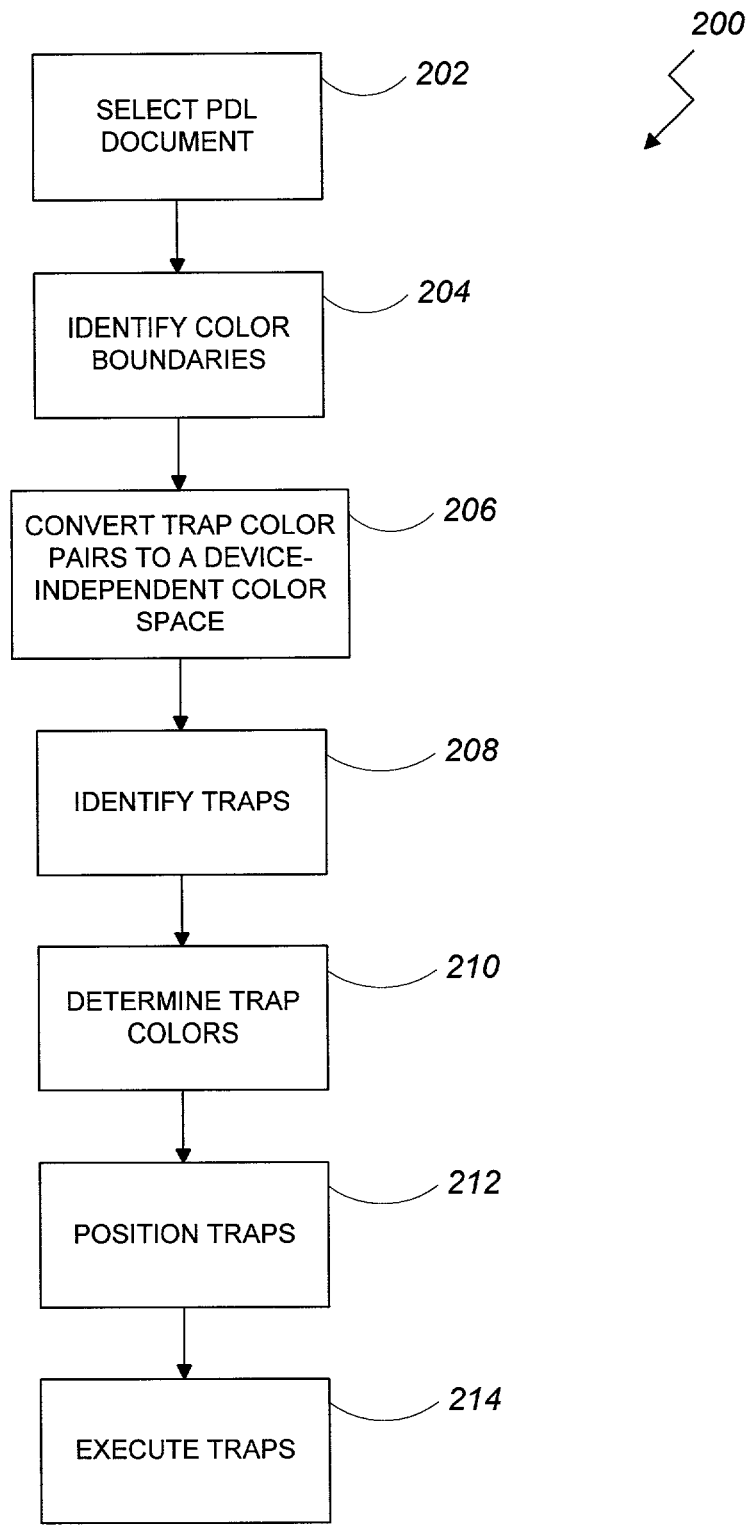
FIG. 2 illustrates one technique for trapping a document in an output device independent color space.

A device independent trapping process 200 for trapping a document in an output device independent color space is illustrated in FIG. 2. A PDL representation for a page to be trapped is selected (202). Color boundaries within the page being trapped are identified (204). This may be done using any convenient technique. In commonly assigned and copending application Ser. No. 08/738,608, entitled "Device-Independent Trapping" by Rocheleau and Felleman (hereby expressly incorporated by reference), techniques for specifying color boundaries (potential trap regions) in an output device independent manner are described. The identified boundaries may be stored as a list of edges where each edge has two associated color values, one for each side of the edge.

Edge color values are converted to a device independent color space (206) producing a list of edges where each edge has two associated color values and each color value is represented in a device independent color space. In one implementation, the edge color values are converted to a color in the CIELAB color space.

Edges whose two associated color values are significantly different are identified as requiring trapping (208). Those edges whose associated color values are not significantly different are not processed in subsequent steps. One technique to determine if two colors are significantly different is to determine if the rectilinear distance between the two colors exceeds a specified threshold. For example, the distance between two CIELAB colors, represented as [L1, A1,B1] and [L2,A2,B2], can be computed as follows:

$$\text{Distance} = [(L1-L2)^2 + (A1-A2)^2 + (B1-B2)^2]^{0.5}$$

If the computed value exceeds a specified threshold, the colors are said to be significantly different and marked for trapping. Color differences can be measured in a unit commonly referred to as ΔE. A typical threshold value could be three to five ΔE but may be larger or smaller.

For those edges identified in step 208, a trap color is calculated (210). One method to calculate a trap color is to compute the mean difference between the two associated edge colors. Another method is to select the trap color calorimetrically. By way of example, consider the task of specifying a trap color (C3) for an edge having a first color (C1) and a second color (C2), where all colors are represented in the CIELAB color space. Let C1=[L1,A1,B1], C2=[L2, A2, B2], and trap color C3=[L3,A3,B3]. When the mean difference method is used:

$$L3=(L2-L1)/2; \; A3=(A2-A1)/2; \text{ and } B3=(B2-B1)/2.$$

If the colorimetric method is used, L3 is set to that L value (L1 or L2) corresponding to the darker of C1 and C2 [L3=DARK(L1, L2)], and:

$$A3=(A2+A1)/2; \text{ and } B3=(B2+B1)/2.$$

The colorimetric method maps the lighter color to the same chromaticity (the combination of A and B color values), but at the darker color's darkness (the L color value), and then bisects the line between them. The colorimetric method assigns a trap color that minimizes the visual discordance between an edge's first and second colors. Given a color space other than CIELAB, a similar approximation method can be employed.

Trap regions are placed into the document's page description file 110 at locations determined by any of a number of well-known rules (212). Some trap placement methods place traps in the lighter color, while other methods place traps on the centerline between the two regions being trapped.

Finally, the PDL file 110 can be executed by an output device (e.g., one of devices 115 through 130) to generate physical output or otherwise stored for display at a later time (214). At the time for display, all color values are converted (by the output device) into its own color space.

The invention has been described in terms of specific examples which are illustrative only and are not to be construed as limiting. The invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors.

Other embodiments are within the scope of the following claims. For example, the order of performing steps of the invention may be changed by those skilled in the art and still achieve desirable results.

What is claimed is:

1. A method for specifying a device independent trap color in a color space for a color boundary, comprising:
   obtaining a first color value (C1), representing a first color in a color space associated with the color boundary, having a first darkness and first chromaticity;
   obtaining a second color value (C2), representing a second color in the color space associated with the color boundary, having a second darkness and second chromaticity; and
   generating a device independent trap color value, representing a color in the color space, having substantially a same darkness as a lighter of the first and second color value, and a chromaticity that is a function of the first and second chromaticities of the first and second color values.

2. The method of claim 1 wherein the first color value and the second color value have a first and second luminocity value, respectively, and wherein a luminocity value of the trap color is selected from one of the first and second luminocity values corresponding to a darker of the first and second color value.

3. The method of claim 1 wherein the first and second color values are associated with a device dependent space, the method further comprising
   prior to generating a trap color value, transforming the first and the second color values from the device dependent space to a device independent space.

4. The method of claim 3 further comprising after generating the trap color value, transforming the trap color value from a device independent space to a device dependent space associated with an output device to be used to render the color boundary.

5. The method of claim 3 wherein the device independent color space is the CIELAB color space.

6. The method of claim 1 wherein the first color value is represented by a first luminosity (L1) and a first pair of chromaticity (A1 and B1) color values, the second color value is represented by a second luminosity (L2) and a second pair of chromaticity (A2 and B2) color values, and the trap color is represented by a third luminosity (L3) and a third pair of chromaticity (A3 and B3) color values and is generated in accordance with:

$$L3=\text{DARK}(L1, L2),$$

$$A3=(A2+A1)/2, \text{ and } B3=(B2+B1)/2,$$

where DARK(L1, L2) returns that value corresponding to a darker of the first and second luminosity color values L1 and L2.

7. A method of specifying output device independent trapping color values in a graphical processing system, comprising:
 obtaining a computer readable file including color objects;
 identifying color boundaries between color objects, each color boundary having an edge and a first color value representing a first color in a color space, and a second color value representing a second color in the color space;
 converting the first and second color values from the color space to a device independent color space;
 identifying trap regions;
 generating a device independent trap color value, representing a color in the device independent color space, for each identified trap region; and
 storing the generated trap color value in an output file.

8. The method of claim 7 further comprising transforming the trap color values from the device independent space to a device dependent space associated with an output device that is to render the color boundaries.

9. The method of claim 7 where the step of identifying trap regions includes identifying only those color boundaries whose difference between respective first and second color values is greater than a predefined threshold value.

10. The method of claim 9 where the difference between color values is computed by determining a rectilinear distance between the respective first and second color values.

11. The method of claim 9 where the step of generating a trap color value includes computing a mean difference between the respective first and second color values.

12. The method of claim 9 where the step of generating a trap color value includes selecting the trap color value colorimetrically.

13. The method of claim 12 where each color value has a luminocity and a chromaticity value, and where the trap color luminocity value corresponds to the luminocity value associated with the darker of the fist and second color values and where the trap color chromaticity value is a function of the first and second chromaticity values.

14. The method of claim 12 where the trap color value is selected by mapping a lighter of the respective first and second color values to a chromaticity but at darkness of a darker of the respective first and second color values.

15. The method of claim 14 where the chromaticity is an average chromaticity.

16. The method of claim 14 where the chromaticity is a function of chromaticities associated with the first and second color values.

17. The method of claim 14 wherein the trap color value is selected by mapping a lighter of the respective first and second color values to a chromaticity at a darkness of a darker of the respective first and second color values and at bisection of a line between them.

18. A method for specifying a device independent trap color in a color space for a color boundary, comprising:
 obtaining a first color value (C1), representing a first color in a color space associated with the color boundary, having a first darkness and first chromaticity,
 obtaining a second color value (C2), representing a second color in the color space associated with the color boundary, having a second darkness and second chromaticity; and
 generating a device independent trap color value, representing a color in the color space, including computing a mean difference between the respective first and second color values.

19. A program storage device readable by a computer system and having encoded therein a program of instructions that includes instructions to:
 obtain a first color value (C1), representing a first color in a color space associated with the color boundary, having a first darkness and first chromaticity;
 obtain a second color value (C2), representing a second color in the color space associated with the color boundary, having a second darkness and second chromaticity, and
 generate a device independent trap color value, representing a color in the color space, having substantially a same darkness as a lighter of the first and second color value, and a chromaticity that is a function of the first and second chromaticities of the first and second color values.

20. A program storage device readable by a computer system and having encoded therein a program of instructions that includes instructions to:
 obtain a computer readable file including color objects;
 identify color boundaries between color objects, each color boundary having an edge and a first color value representing a first color in a color space, and a second color value representing a second color in the color space;
 convert edge color values to a device independent color space;
 identify trap regions;
 generate a device independent trap color value, representing a color in the device independent color space, for each identified trap region; and
 store the generated trap color value in an output file.

21. A program storage device readable by a computer system and having encoded therein a program of instructions that includes instructions to:
 obtain a first color value (C1), representing a first color in a color space associated with the color boundary, having a first darkness and first chromaticity;
 obtain a second color value (C2), representing a second color in the color space associated with the color boundary, having a second darkness and second chromaticity; and
 generate a device independent trap color value, representing a color in the color space, including compute a mean difference between the respective first and second color values.

* * * * *

UNITED STATES PATENT AND TRADEMARK OFFICE
CERTIFICATE OF CORRECTION

| | | |
|---|---|---|
| PATENT NO. | : 6,970,271 B1 | Page 1 of 1 |
| APPLICATION NO. | : 09/922345 | |
| DATED | : November 29, 2005 | |
| INVENTOR(S) | : James J. Estrada and John P. Felleman | |

It is certified that error appears in the above-identified patent and that said Letters Patent is hereby corrected as shown below:

Column 6, line 26, delete "haying" and replace with --having--.

Signed and Sealed this

Eighteenth Day of July, 2006

JON W. DUDAS
*Director of the United States Patent and Trademark Office*